No. 616,673. Patented Dec. 27, 1898.
C. W. KENNEDY.
ELECTRIC MOTOR AND METHOD OF CONTROLLING SAME.
(Application filed Apr. 22, 1898.)
(No Model.) 3 Sheets—Sheet 2.
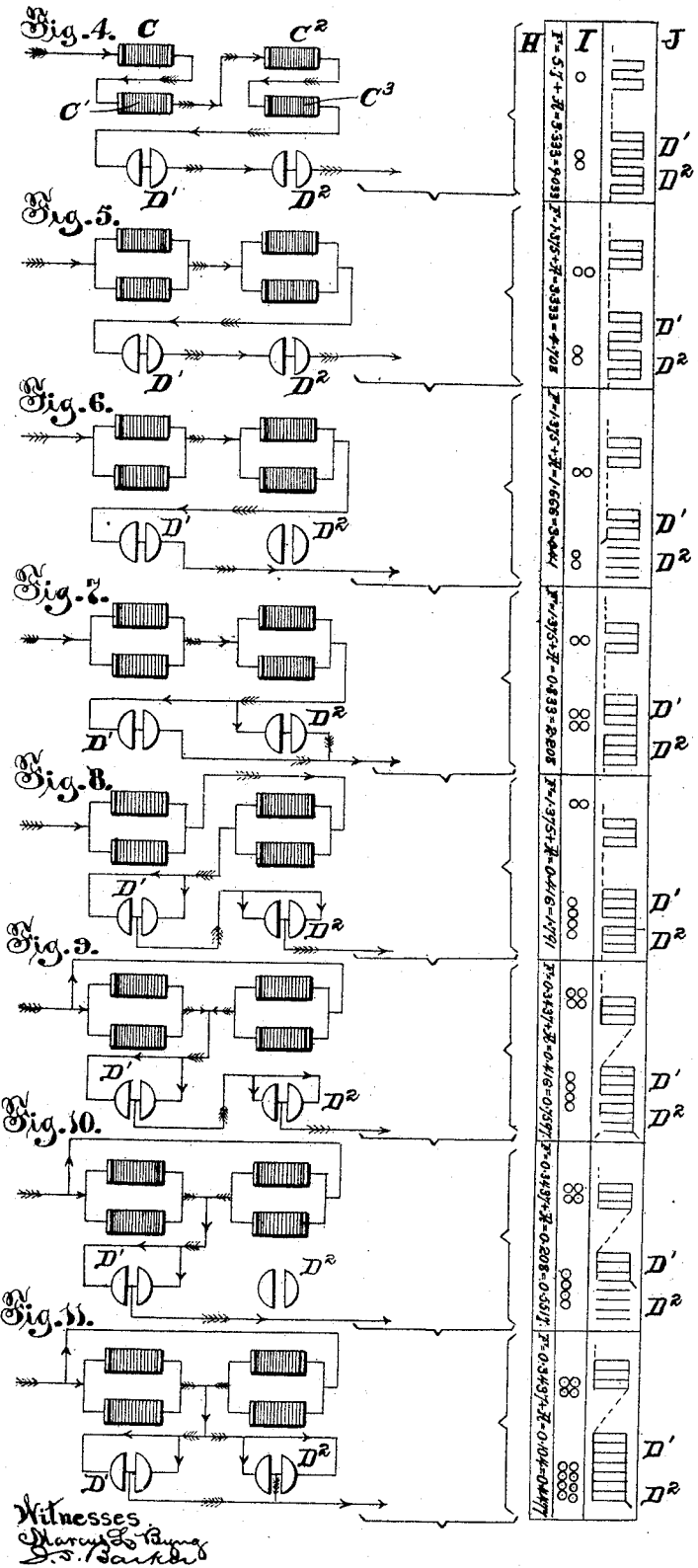
Witnesses
Inventor
Charles W. Kennedy
by
H. H. Bliss, Attorney

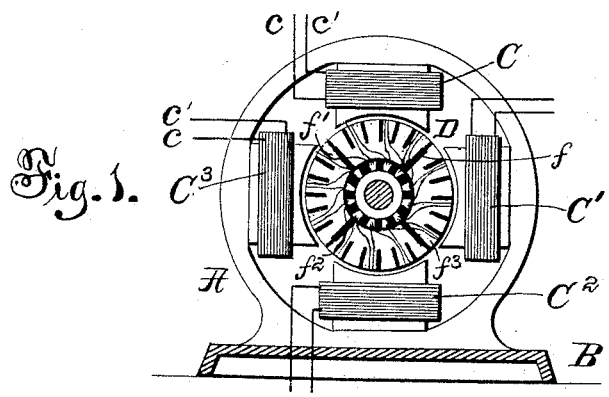
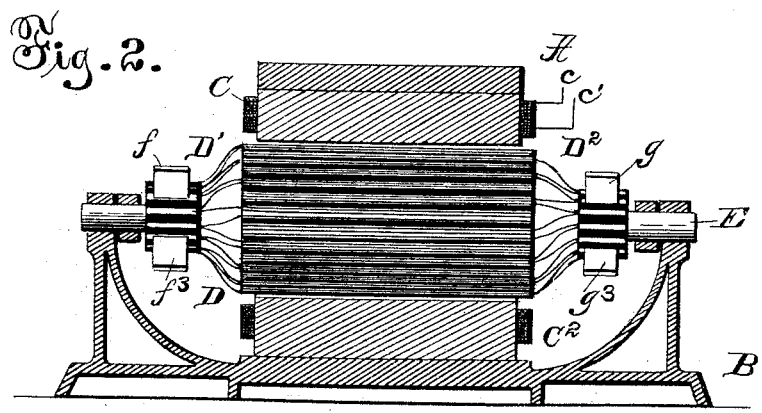
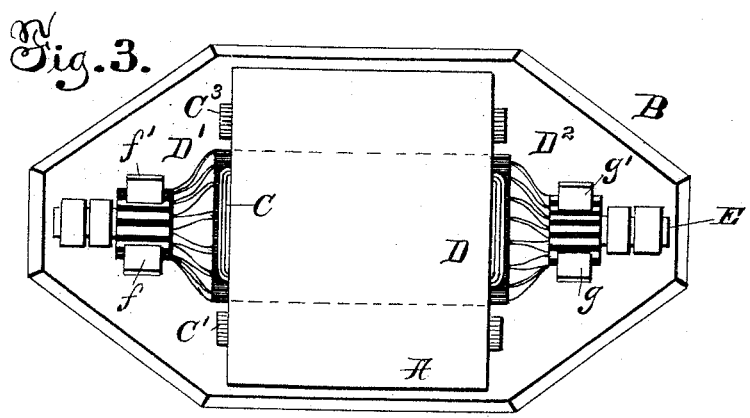

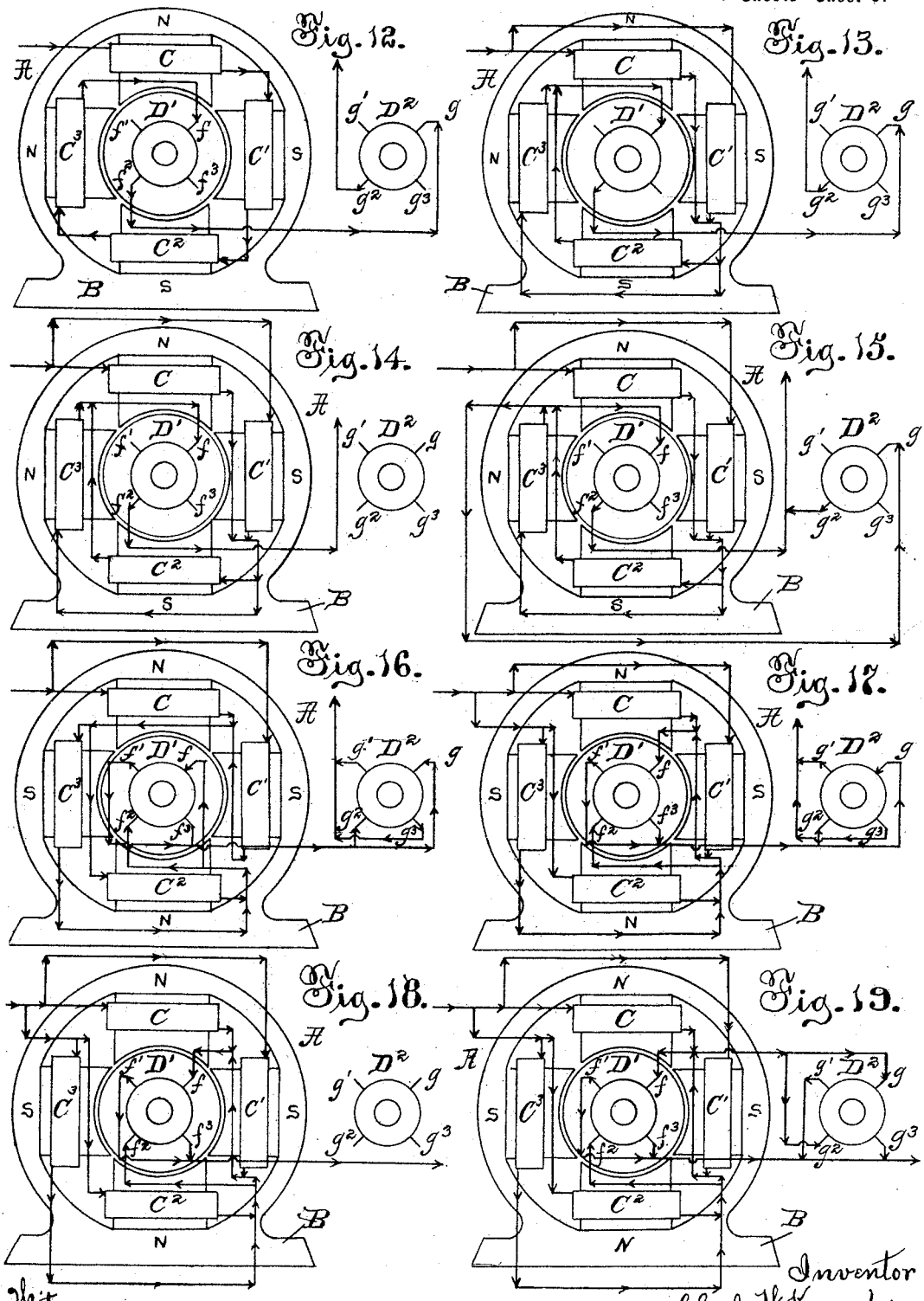

UNITED STATES PATENT OFFICE.

CHARLES W. KENNEDY, OF RUTLEDGE, PENNSYLVANIA, ASSIGNOR TO SAMUEL Y. HEEBNER, OF SAME PLACE.

ELECTRIC MOTOR AND METHOD OF CONTROLLING SAME.

SPECIFICATION forming part of Letters Patent No. 616,673, dated December 27, 1898.

Application filed April 22, 1898. Serial No. 678,518. (No model.)

*To all whom it may concern:*

Be it known that I, CHARLES W. KENNEDY, a citizen of the United States, residing at Rutledge, in the county of Delaware, State of Pennsylvania, have invented certain new and useful Improvements in Electric Motors and Methods of Controlling the Same; and I do declare the following to be a full, clear, and exact description of the invention, such as will enable others skilled in the art to which it appertains to make and use the same, reference being had to the accompanying drawings, and to the letters of reference, which form a part of this specification.

Figure 1 is an end view of the parts of a motor sufficient to illustrate one embodying my improvements. Fig. 2 is a vertical longitudinal section. Fig. 3 is a plan view. Figs. 4 to 11 are diagrammatic views showing the different paths which the current is caused to take at different times and which variations in paths are utilized as a means for internally controlling the motor, each of these figures also illustrating, by lines at the right hand of each figure, the cross-section of the current's path. Figs. 12 to 19 are views, more or less conventional, of a motor and also serve to illustrate the different paths taken by the current at the different stages of control.

In the drawings I have selected a motor of one of the sorts to which my invention is applicable for the purpose of illustrating how my invention can be embodied; but it is to be fully understood that in this respect there can be wide variation, as the essential features of the invention can be employed in either of numerous forms of machines. Considering the one illustrated, A indicates generally the field metal carried by a base-piece at B, which is secured to any suitable support. This field has four field-magnets C C' C² C³, which are of a well-known type, each consisting of a core and a wire coil with terminals at $c$ $c'$. By connecting up the terminals of the several magnets properly it will be seen that the machine as a whole may have two poles or four, as desired, and that two poles, as at C C², may be formed of a single coil each, or that two neighboring coils can be connected in such a way as to produce a common pole. Thus the magnets at C and C² can be used to produce opposite poles, while those at C' C³ may be idle, or the connections may be such that both those at C and C³ shall produce each the same pole and together a common pole, as north, and that the others at C' and C² can be so connected as to each produce a south pole, and together a common pole of that polarity. In each case the machine as a whole will be bipolar, though each pole is produced by multiple coils; or, again, the four magnets may alternate with respect to the polarities they produce, thus that at C forming a north pole, that at C' a south, that at C² a north, and that at C³ a south; and it will be further seen that under any of these relative arrangements or connections of the coils the field will be "balanced" in all parts around its axis. A further fact to be noticed is that by having the field-circuit of the motor thus divided up into four parts there can be obtained by permutations and combinations a large number of variations in resistance for the current. Thus all the four coils at C C' C² C³ may be connected in series, thus interposing the entire resistance of the field-circuit to the current or that part thereof which passes through that circuit; or, again, they may be coupled up so that two of the magnets, as at C C', will be a pair in parallel with each other, and the others at C² and C³ will be another pair in parallel with each other, the two pairs being in series. Still other modifications in the current-path through the field-magnets are possible—as, for instance, through all of the coils in parallel with each other; but I have found that the purpose at which I aim can be attained by the two connections of the field-coils above described—namely, first having them all in series with each other and then having two in a pair in parallel with each other and the other two in a pair in parallel with each other and the two pairs in series; and, still further, it will be seen that I can so connect and couple up the parts of the field as to both modify the internal resistance of the field-circuit and also modify the number of poles produced by the current as it passes through—that is to say, I can have the field-coils in series and so relatively arranged as to produce two poles, or I can have a pair of magnet-coils in parallel with each other and in series with the other pair and at the same time have them produce only two poles, or I can have the coils all in series with each other and arranged to produce four poles, or I can connect them so that two shall be parallel in a pair, which pair is in series with the other pair, and at the same time have them produce four poles.

Passing now to the armature, the one selected for illustration is indicated as a whole by D and has a shaft E, mounted in the ordinary or any preferred way. The armature is made up of two parts, which I have indicated generally by $D'$ and $D^2$. Each part comprises a set of coils and a commutator. The two parts are preferably arranged as exact counterparts of each other, one having its commutator at one end and the other at the other end, as this allows me to have each point of each wire of the part $D'$ of the armature homologously situated with respect to the corresponding point of the wire in the part $D^2$ of the armature—that is to say, the wire of any coil of the whole armature may be exactly the same length as that of any other coil, and they are all similarly situated with respect to the axis and with respect to the field. At the same time I wish it understood that there can be modifications in this respect, as the essential features of my invention can be retained, even if the two parts of the armature should have their commutators at the same end of the armature, although the mechanical or structural difficulties are somewhat greater in that case.

Each armature part has its commutator supplied with four brushes, those for the part $D'$ being indicated by $f\,f'\,f^2\,f^3$ and those for the part $D^2$ being indicated by $g\,g'\,g^2\,g^3$.

The connections between the field and the several parts of the commutator or between the latter and the line may be varied in numerous ways, as will be readily seen. Thus one part of the armature may be left entirely idle and to the other part connections can be made through two of its brushes only—as, for instance, those at $f\,f^2$—the other two brushes being cut out. Again, one part of the armature may remain idle, while the connections with the other part may be made through four of the brushes $f,\,f',\,f^2$, and $f^3$. Still, again, both parts $D'$ and $D^2$ of the armature may be in action and connections made with each through a single pair of brushes—as, for instance, the brushes $f\,f^2$ of the part $D'$ and the brushes $g\,g^2$ of the part $D^2$—or the two parts $D'\,D^2$ of the armature may be both in action and the connections with each may be made through all four of its brushes. Still further, the connections may be so arranged as that the two parts $D'\,D^2$ of the armature may be in series with each other, whether the current is entering or escaping through two brushes or four, or said two armature parts may be in parallel under either of said brush conditions.

I have not shown the details of any particular form of controller—that is to say, the mechanism for switching the current in or out from the line and for making the different connections through the several parts of the motor. Numerous such control mechanisms are well known which can be readily modified to carry out the present invention, or any other that is preferable can be employed.

Having noted above the possible variations in the connections that can be attained when the parts are constructed and related as described, I will now call attention more particularly to those features which constitute my invention, and reference may be made to the diagrammatic illustrations in Figs. 4 to 11, which figures may be regarded as conventionally illustrating the several steps or stages in the passage of the current from the time of starting until the time that the parts are in full working position.

By reference to Figs. 4 and 12 it will be seen that at the first step the connections are such that the current passes through the four field-coils C C' $C^2$ $C^3$, all in series, and then through the two parts $D'$ $D^2$ of the armature in series with each other and in series with the field. At such time the total internal resistance of the machine is in play. It will be further seen that the parts are so connected that two of the coils, as C $C^3$, though in series, generate like poles, and that the others, C' $C^2$, generate opposite like poles—that is to say, that the field is bipolar. Under these circumstances the armature has two brushes only in action with each part $D'$ $D^2$.

Then, considering Figs. 5 to 13, it will be seen that at the second step the connections of the field-coils are changed in such a way as to throw two of them, as C and C', into parallel with each other and the other two, $C^2$ and $C^3$, also in parallel with each other, the first pair being in series with the second pair, the two parts of the armature remaining in series as at the first step. Under these conditions the quantity of current passing through the motor is increased, the resistance of the field-circuit being reduced. Current is still conveyed to and from each part of the armature through two brushes only, and the machine as a whole still remains bipolar. At the third step another quantum of resistance is withdrawn by cutting out one-half, as $D^2$, of the armature entirely, as illustrated in diagram and Figs. 6 and 14; but at the next step (illustrated in Figs. 7 and 15) the part of the armature which was previously cut out is again introduced, but is thrown into parallel with the other part at $D'$, so that the internal resistance of the armature is cut in half, that of the field remaining as at the previous step. The machine as a whole still remains bipolar.

At the next stage the connections are changed in such way as to convert the motor into one with four alternating poles. The result is illustrated in Figs. 8 and 16, it being accomplished by reversing the path of the current through two of the field coils, as those at C² and C³. The coils C and C' are in parallel and those at C² C³ are also in parallel with each other, but the two pairs are in series. Hence the internal resistance of the field remains as it was at the previous steps, notwithstanding the changes in polarity. Simultaneously with these changes in the field two changes are effected in the armature—first, the two parts D D' being thrown back from parallel to series relation and the four brushes of each being brought into action. The employment of the four brushes with each armature part cuts down the total armature resistance to one-half of what it was at the previous stage, although the parts D' D² are in series.

At the sixth step (illustrated in Figs. 9 and 17) the parts of the armature are allowed to remain in the last-described relation with each other and with the field; but another step down in the internal resistance of the machine is attained by shifting the two parts of the field from series to parallel relation—that is to say, the pair C C' are kept with the same polarities, and also the pair at C² C³, and those of each pair are maintained in parallel with each other, but now the two pairs are in parallel. Hence the internal resistance of the field drops to one-fourth of what it previously was, that of the armature remaining the same.

At the seventh stage (illustrated in Figs. 10 and 18) the parts of the field are kept in the last-described relation; but the internal resistance of the armature is reduced one-half by cutting out one of its parts, as at D². The machine still remains multipolar. The matter to be particularly noted in this connection is that although one half of the armature is cut out entirely and the other half remains in, the machine is perfectly and uniformly balanced as concerns both the armature and the field, there being no region of distortion around the axis.

The eighth and final step involves placing the part or half D² of the armature again in circuit, but now in parallel with the other part D', as illustrated in Figs. 11 and 19. This change of the two parts of the armature from series to parallel provides another reduction in the internal resistance, that of the armature as a whole being reduced one-half. The parts of the field remain in the same relation to each other and to the armature as at the last stage. The motor is now in full working adjustment. The two halves of the field are in parallel with each other and in series with the two halves of the armature, which in turn are in parallel with each other. The field has four alternate poles, and the four brushes at each end of the armature are in action. The greatest quantity of current intended is now passing through the machine; but as the adjustments or changes of connections have been made through these several steps above described the speed of the armature has been gradually increasing, and consequently the counter electromotive force has been correspondingly rising, so that by the time the final step has been taken it is safe to allow the full predetermined quantity of current to enter.

In connection with and adjacent to the diagrams of the field and motor in Figs. 4 to 11, respectively, I have also shown diagrams illustrating the relative increase in the cross-sections of the paths of the current from time to time.

One of the principal objects of the present invention is to so construct and relate the parts of a motor that they can be utilized to automatically and readily control the quantity of current received by the machine and avoid entirely the use of any external resistance. It requires no description of the fact now well known that the employment of external "dead" resistance in the control of motors is a serious disadvantage and a matter of great loss.

I am aware of the fact that several plans have been proposed and efforts have been made to attain internal and automatic control of motors without the use of external resistance; but in all cases within my knowledge successful results have been attained only when the mechanism employed has been complicated and expensive. Among the plans that have been proposed or tried has been the employment of a motor having a field with four cores, two of which are provided with coils and two are without coils, together with an armature essentially integral throughout and having four brushes, in combination with a controller adapted to connect up the parts, first, in such way as to have the two wound cores and the two unwound cores of the field provide two opposite poles and to have two of the brushes of the armature in circuit, and then, second, to have the two field-coils reversed, so as to produce four alternating poles, (two wound and two unwound,) and at the same time have the four brushes of the armature so related as to shunt one-half of the armature; but means of this sort are not found successful or practical or of such nature that external resistance can be entirely dispensed with. First, they are deficient in capacity to provide sufficient variations in the relations of the field-magnets when having only two coils; secondly, they are deficient in the extent of variations possible in the armature, the latter, as aforesaid, being integral throughout—that is, formed of a single set of coils with a single set of brushes—and, third and principally, because of the shunting of ally imperfect, because of the shunting of one-half of the armature, which as soon as it occurs instantly throws the armature out of balance with the field, producing the numerous evil results well known to electrical engineers. I believe myself to be the first to have devised such a construction and relation of parts as that I can produce within the motor itself a long series of steps of variation and at every one of these steps and at all times maintain the perfect balance of the machine. As above described, even when one part of the armature is entirely cut out from the circuit the other part has its different sections uniformly acting electrically and magnetically around the axis. By employing four active coils in the field I can insure the requisite number of variations both in internal resistance and in polarity and supplement these by the increased number of variations made possible by the form of armature which I employ.

I am also aware that an armature having two more or less independent parts (somewhat similar, from a mere structural standpoint, to that herein shown) has been heretofore proposed and also that a two-part armature has been suggested in a varipolar machine with a system of control therefor involving a series of steps, one or more of which necessitate the supplying of current to one set of the armature-coils at times in greater quantity than that supplied to the other set, this being accomplished by shunting one of the sets of the armature-coils through more or less external resistance; but I believe myself to have been the first to have discovered the principle herein set forth and to have embodied it in an operative mechanism consisting in maintaining an armature in continuous balance while cutting more or less of it out of or into action and changing the machine as a whole from one which is bipolar to one which is multipolar, and, further, believe myself to be the first not only to have thus maintained all the coils in the total armature-circuit balanced with respect to the quantity of current, but also to have devised a method of controlling a motor capable of having both field and armature in multipolar conditions, involving the throwing of the different sets of armature-coils into series while multipolar, reducing the resistance in the multipolar field, and finally having several of the field-coils in parallel and the two sets of armature-coils in parallel. I have designed such an easy gradation in the changes of the resistance in the field and of that in the armature that a constant reduction of the total resistance can be attained from step to step from the first introduction of the current to the final free full admission thereof and without external resistance, as aforesaid, and in this connection it is to be noted that while above I have for the purpose of specific description referred particularly to the present machine as having four poles, the same principle may be employed with one having a greater number of poles, as six or more. Therefore I do not wish the invention limited to the changing of a two-pole machine to one of four poles. In connection with Figs. 4 to 11 and at the side of each I have in the column H indicated the internal resistance presented by a certain motor (whose data I have observed for the purpose of this illustration) at that stage of the regulation when its parts are in the relative positions illustrated in the corresponding figure. In this particular machine when all of the parts of the field and both halves of the armature were in series throughout the total internal resistance was 9.033 ohms, and when the final stage of regulation was reached the total resistance was .4477 ohms, the resistance at each of the intermediate steps of regulation being indicated in said column H opposite to Figs. 4 to 11 in the drawings. At I, at the side of column H, a series of circles and of clusters of circles illustrate the gradual increase in the cross-sectional area of the paths of the current at each stage in the regulation, and at J, by the side of the columns H and I, there are a series of diagrams which also illustrate the paths of the current at different times with respect to the four coils of the field and the two halves of each part $D'$ and $D^2$ of the armature; but I do not, of course, limit myself to a motor having the specific electrical data, such as presented in the drawings for illustration.

I herein refer to the "supply-circuit," the "motor-circuit," the "field-circuit," and the "armature-circuit," using these terms for convenience in explaining the different electrical parts of the mechanism, by the "armature-circuit" meaning the part or parts of the current path or paths between the initial contact or contacts where the current first enters the armature and the contact or contacts through which it finally escapes; by the "field-circuit" meaning the part or parts of the current-path around the field-magnets, excluding the armature-circuit and the mains; by the "motor-circuit" meaning the last two above-described circuits together—namely, the field-circuit and the armature-circuit—and by the "supply-circuit" meaning the mains or current-supply conductors which are external to the motor-circuit, and in each instance excluding what is commonly known as a "resistance-circuit."

What I claim is—

1. The herein-described method of controlling an electric motor, which consists in starting the motor as a two-pole machine with a set of field-coils in series with each other and subsequently changing it to a multipolar machine with all of said field-coils in parallel, and changing the internal resistance of the armature and maintaining the armature in balance uniformly around its axis, substantially as set forth.

2. The herein-described method of controlling an electric motor, which consists in starting the motor as a two-pole machine with four active coils generating two balanced opposite poles only, subsequently reversing two of said coils to form four field-poles of which two are to produce poles alternating with those of the other two, and supplying current to and taking it from the armature first through two armature-circuits in series, and afterward through said circuits in parallel substantially as set forth, to maintain the armature in uniform action and balance around its axis, without shunting, substantially as set forth.

3. The herein-described method of controlling an electric motor, which consists in starting the said motor as a two-pole machine, with four active coils, each on an independent core, and all in series, subsequently connecting two of the said coils in a parallel pair and the other two coils in a second parallel pair, said two pairs being in series, and subsequently reversing two of the said coils relatively to the other two to produce four active poles of alternating polarity and through all said steps supplying current to the armature and withdrawing it therefrom uniformly around its axis, to maintain its balance without shunting, substantially as set forth.

4. The herein-described method of controlling an electric motor, which consists in starting the said motor as a two-pole machine with four active coils each on an independent core and all in series, subsequently placing two of said coils in a parallel pair and the other two in a second parallel pair said two pairs being in series, and subsequently reversing the current through two of said coils and supplying current to the armature and taking it therefrom first through two contacts, such as brushes, and subsequently through four contacts, substantially as set forth.

5. The herein-described method of controlling an electric motor, which consists in starting the motor as a two-pole machine with four active field-coils each on an independent core and all in series subsequently connecting up said coils in two parallel pairs in series and simultaneously supplying current to and leading it from the armature through two opposite brushes or contacts, subsequently reversing the current through two of the active coils of the field, and producing four active alternating poles and supplying the current to and leading it from the armature through four alternating brushes or contacts, substantially as described.

6. The herein-described method of controlling an electric motor, which consists in starting the motor as a two-pole machine with four active field-coils each on an independent core and all in series, subsequently connecting up said coils in two parallel pairs in series and simultaneously supplying current to and leading it from the armature through two opposite brushes or contacts, subsequently reversing the current through two active coils of the field and producing four active alternating poles and supplying the current to and leading it from the armature through four alternating brushes, or contacts without at any time shunting any part of the motor, substantially as described.

7. The herein-described method of controlling an electric motor, which consists in starting the motor by supplying current to four field-coils each upon an independent core and all in series, subsequently placing two of said coils in a parallel pair, and the other two in a second parallel pair, supplying current to one set of coils on the armature through two brushes, and to another independent set of coils upon the armature through two independent brushes, and subsequently changing the motor to a four-pole machine, and at all times maintaining the armature in uniform balance around its axis, substantially as set forth.

8. The herein-described method of controlling an electric motor, which consists in supplying current to a set of coils upon its armature through two opposite contacts or brushes, and also to another independent set of coils on the armature through two independent brushes or contacts, subsequently delivering current to and leading it from each of said two sets of coils through four contacts or brushes for each set of coils, and supplying current to the field first in such manner as to have it bipolar, with a relatively high resistance in the field-coils, and afterward have it bipolar with a reduced resistance in said field-coils, and subsequently, in such manner as to have it multipolar, in correspondence with the changes in the armature, substantially as set forth.

9. The herein-described method of controlling an electric motor which consists in first supplying current to a set of coils in the armature through two contacts or brushes, and simultaneously to another independent set of coils on the armature through two contacts independent of those aforesaid, and supplying current to the field through two or more coils first in series, and afterward in parallel to form a bipolar field, and subsequently through a series of field-coils in manner substantially as described to produce a multipolar field, in accordance with the changes in the armature, substantially as set forth.

10. The herein-described method of controlling an electric motor which consists in supplying current to an armature in a manner substantially as set forth to have it bipolar, subsequently supplying current thereto in manner substantially as set forth to have it multipolar and uniformly active or balanced electromagnetically entirely around its axis and supplying current first in a relatively low quantity and afterward in a higher quantity to the field-magnets around the armature to form two poles, and subsequently producing four alternating poles in the field in correspondence with the changes in the armature, substantially as set forth.

11. The herein-described method of controlling an electric motor which consists in supplying current to a set of coils in the armature which are distributed uniformly around the axis through two contacts or brushes and to a second set of coils independent of the first and similarly distributed, through a second set of independent contacts or brushes, said two sets of coils being in series, supplying current to the field through two or more field-coils in series, subsequently placing one part of the field-circuit in parallel with another part and cutting out entirely one of the said independent sets of coils in the armature, and thereafter restoring the last said set of armature-coils in parallel with the other set, and maintaining both parts of the field in circuit, substantially as set forth.

12. The method of controlling a varipolar electric motor independently of resistance external to the motor-circuit proper, it consisting in starting the motor as a bipolar machine with a relatively high internal resistance and thereafter constantly decreasing the internal resistance of the field-circuit, and finally putting the machine into a full-load condition as a multipolar motor, substantially as set forth.

13. The method of controlling a varipolar electric motor independently of resistance external to the motor-circuit proper, it consisting in starting the motor as a bipolar machine with a relatively high internal resistance and thereafter constantly decreasing the internal resistance of the field-circuit, and finally putting the machine into a full-load condition as a multipolar motor, substantially as set forth.

14. The method of controlling an electric motor, which consists in starting the motor with a relatively high resistance in both the field-circuit and the armature-circuit, subsequently during one or more steps lowering the resistance of the field-circuit, and maintaining that of the armature-circuit, immediately thereafter during one or more steps lowering the resistance of the armature-circuit and maintaining that of the field-circuit and subsequently reducing the resistance simultaneously in both the field-circuit and the armature-circuit, substantially as set forth.

15. The method of controlling an electric motor, it consisting in starting the motor as a two-pole machine with a relatively high resistance in the field-circuit and in the armature-circuit, subsequently reducing the resistance in the field-circuit, but maintaining the resistance in the armature-circuit, subsequently reducing the resistance in the armature-circuit, but maintaining the resistance in the field-circuit, and subsequently changing the motor to a multipolar machine, substantially as set forth.

16. The method of controlling an electric motor independently of resistance external to the motor proper, it consisting in starting the motor as a two-pole machine, subsequently changing it to a multipolar machine, and changing the internal resistance of the armature, and maintaining the armature in balance uniformly around its axis, the current at all times after its introduction passing directly from one line conductor to the field, directly from the field to the armature and directly from the armature to the other line conductor, substantially as set forth.

17. The method of controlling an electric motor, consisting in starting the motor as a two-pole machine and passing current through two or more field-coils in series and through the armature in series with the fields, subsequently placing one part of the field-circuit in parallel with the other part and maintaining the armature in series with the field, and thereafter changing the motor to a multipolar machine, and at all times maintaining the armature in balance uniformly around its axis, substantially as set forth.

18. The method of controlling an electric motor, it consisting in starting the motor as a two-pole machine with four field-coils, passing the current through the said coils in series and through the armature in series with the field, subsequently placing two of said field-coils in parallel and in series with the other two coils, still maintaining the armature in series with the field; and subsequently passing the current through one part of the armature in parallel with another part, still maintaining the armature as an entirety in series with the field, substantially as set forth.

19. The method of controlling an electric motor, having four poles each with its energizing-coil, it consisting in starting the motor as a two-pole machine and passing the current through the said four coils in series and through the armature in series with the field, subsequently placing two of said field-coils in parallel and in series with the other two field-coils, still maintaining the armature in series with the field, subsequently placing one part of the armature in parallel with the other part, and both in series with the field, and subsequently changing the motor to a four-pole machine, substantially as set forth.

20. The method of controlling an electric motor having four poles and four energizing-coils in the field, and a two-part armature, it consisting in first passing the current through the said parts of the field and of the armature in series, and finally passing it through all the coils of the field in parallel with each other and through both parts of the armature in parallel with each other, substantially as set forth.

21. The method of controlling an electric motor having four field-coils and a two-part armature, it consisting in passing the current through the said four field-coils in series and through the two parts of the armature in series with each other and in series with the field, subsequently passing it through two of the field-coils in parallel and then through the other two in parallel, still maintaining the two parts of the armature in series with each other and with the field, subsequently cutting out of circuit one part of the armature while the other part remains in series with the series parallel field-coils, and finally placing the four field-coils in parallel with each other and the two parts of the armature in parallel with each other and in series with the field.

22. The method of controlling an electric motor having four field-coils and a two-part armature, it consisting in passing the current through the four field-coils in series and through the two parts of the armature in series with each other and in series with the field, subsequently placing one half of the field in series relationship with the other half, and maintaining it as an entirety in series with the armature, subsequently placing the two parts of the armature in parallel with each other, and, as an entirety, in series with the series parallel arrangement of the field, subsequently passing the current through two parallel paths in each half of the armature, while the armature as an entirety is in series with the field, and finally passing the current through the four field-coils in parallel with each other, and through the four aforesaid paths in the armature, substantially as set forth.

23. The method of controlling an electric motor, having an armature provided with two sets of independent coils, each capable of being bipolar or multipolar, said method consisting in supplying current to each said set of armature-coils when in its bipolar condition, and both sets being in series, subsequently paralleling the two sets of armature-coils while in bipolar condition, and subsequently placing the said two sets of armature-coils in series and changing each to its multipolar condition, and supplying current to the field with a high resistance and in such manner as to have it bipolar with a lower resistance and subsequently in such a manner as to have it multipolar, in correspondence with the changes in the armature, substantially as set forth.

24. The method of controlling a varipolar electric motor having an armature provided with two sets of independent coils each capable of being multipolar, said method consisting in placing the said two sets of armature-coils in series while each thereof is in its multipolar condition, supplying current to the field in such manner as to have it multipolar in correspondence with the armature, then reducing the resistance of the field-circuit subsequently cutting out one of said sets of armature-coils, and maintaining the other in its multipolar condition, and subsequently paralleling the two sets of armature-coils while both are in their multipolar condition, substantially as set forth.

25. The method of controlling a varipolar electric motor having an armature provided with two sets of independent coils, each capable of being multipolar, said method consisting in placing the said two sets of armature-coils in series while each thereof is in its multipolar condition, supplying current to four field-coils in such a manner as to have the fields multipolar, two of said field-coils being in series with two others, and subsequently paralleling the said two sets of multipolar armature-coils, and paralleling the four field-coils, substantially as set forth.

26. The method of controlling a varipolar electric motor having a set of field-coils and two independent sets of armature-coils, said method consisting in first connecting up all of said coils in series to provide a bipolar condition for the motor with a relatively high internal resistance, and finally at the full-load working position paralleling all of said field-coils, and paralleling the two sets of armature-coils, the latter being in multipolar condition, substantially as set forth.

In testimony whereof I affixed my signature in presence of two witnesses.

CHARLES W. KENNEDY.

Witnesses:
S. GOODMAN, Jr.,
WM. FINDLAY BROWN.